United States Patent Office.

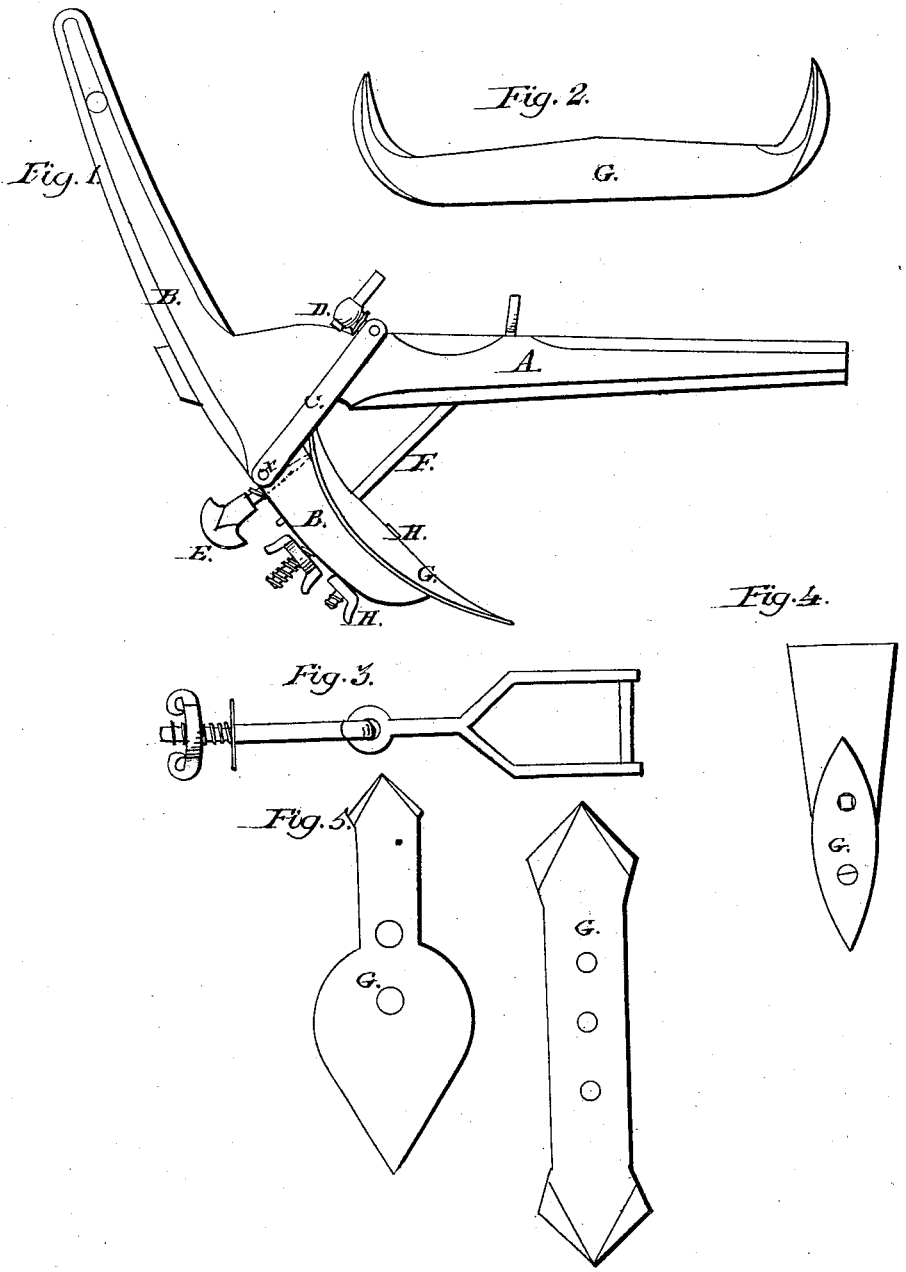

WILLIAM H. STARTZMAN, OF BIG LICK, VIRGINIA.

Letters Patent No. 68,393, dated September 3, 1867.

IMPROVEMENT IN CULTIVATOR-PLOUGHS.

*The Schedule referred to in these Letters Patent and making part of the same.*

TO ALL WHOM IT MAY CONCERN:

Be it known that I, WILLIAM H. STARTZMAN, of Big Lick, in the county of Roanoke, and in the State of Virginia, have invented certain new and useful Improvements in Cultivators; and do hereby declare that the following is a full, clear, and exact description thereof, reference being had to the accompanying drawings, and to the letters of reference marked thereon. In the annexed drawings, making part of this specification—

A represents the beam of the plough, and B the shank at the rear end of the beam, which extends down, and is provided with the blades or teeth for ploughing or cultivating. This shank runs above the beam, and is provided at its upper end with suitable handles for holding the plough. F represents a brace-rod, which passes through the beam, and through the lower portion of the shank, to brace and strengthen said shank. C represents a stirrup, which is pivoted to the shank B, as seen, and binding on the upper side of the beam, being secured to the beam by means of a set-screw, D. This stirrup acts as an additional brace to the shank. H' represents a bolt, which confines the tooth or blade to the shank, being provided with a nut, H. E represents a set-screw, which passes through the shank from its back side, and which serves to regulate the set of the upper end of the blade or tooth. By throwing out the upper end of the tooth the lower end will be of course thrown in, and the tooth will be made to run deeper into the earth.

It will be seen from the figures that I make a variety of double teeth, or teeth which are reversible, so that when one end is worn the other can be turned, or they may be turned or shifted to suit the kind of work for which the different shapes are made. The ends of the teeth or blades may be formed alike or differently, as may be desirable.

Having thus fully described my invention, what I claim as new, and desire to secure by Letters Patent, is—

The arrangement with the beam A and shank B of the stirrup C, set-screw E, brace F, bolt H', and the teeth G, made reversible, with the same or different-shaped ends, as and for the purpose set forth.

In testimony that I claim the foregoing I have hereunto set my hand this 20th day of May, 1867.

WILLIAM H. STARTZMAN.

Witnesses:
WM. H. LYDICK,
RICH'D MATHEWS.